(12) United States Patent
Brelay

(10) Patent No.: US 7,202,911 B2
(45) Date of Patent: Apr. 10, 2007

(54) METHOD AND/OR CIRCUIT FOR IMPLEMENTING A ZOOM IN A VIDEO SIGNAL

(75) Inventor: Herve Brelay, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 522 days.

(21) Appl. No.: 10/720,360

(22) Filed: Nov. 24, 2003

(65) Prior Publication Data

US 2005/0110900 A1    May 26, 2005

(51) Int. Cl.
*H04N 5/44* (2006.01)
*H04N 7/01* (2006.01)

(52) U.S. Cl. .................. 348/561; 348/448; 348/459

(58) Field of Classification Search ............... 348/561, 348/441, 448, 451, 452, 458, 459, 556, 555, 348/554
See application file for complete search history.

(56) References Cited

U.S. PATENT DOCUMENTS

| 5,208,669 | A | * | 5/1993 | Richards | 348/445 |
| 6,118,486 | A | * | 9/2000 | Reitmeier | 348/441 |
| 6,144,412 | A | * | 11/2000 | Hirano et al. | 348/441 |

* cited by examiner

*Primary Examiner*—Michael H. Lee
(74) *Attorney, Agent, or Firm*—Christopher P. Maiorana PC

(57) ABSTRACT

An apparatus comprising a de-interlacer circuit, a rate converter circuit and a zoom circuit. The de-interlacer circuit may be configured to generate a first progressive signal having a first rate in response to an interlaced signal. The rate converter circuit may be configured to generate a second progressive signal having a second rate in response to the first progressive signal. The zoom circuit may be configured to generate an output video signal in response to the second progressive signal. The output video signal may represent a portion of the second progressive signal having a frame size equal to a frame size of the interlaced signal.

19 Claims, 5 Drawing Sheets

METHOD AND/OR CIRCUIT FOR IMPLEMENTING A ZOOM IN A VIDEO SIGNAL

FIELD OF THE INVENTION

The present invention relates to video signals generally and, more particularly, to a method and/or circuit for implementing a zoom in a video signal.

BACKGROUND OF THE INVENTION

Conventional solutions for implementing a zoom feature in a video system use extra hardware in addition to the hardware needed to generate and process the video. The extra hardware is dedicated to implementing the zoom. Implementing extra hardware adds to the overall cost of a system. Also, conventional zooms are typically available for playback only (i.e., not available on echo during record). Conventional zoom features do not provide a high quality zoom (i.e., with a minimum of artifacts), particularly when implemented in interlaced video.

It would be desirable to implement a zoom feature that minimizes artifacts and may be implemented by incorporating existing hardware.

SUMMARY OF THE INVENTION

One aspect of the present invention concerns an apparatus comprising a de-interlacer circuit, a rate converter circuit and a zoom circuit. The de-interlacer circuit may be configured to generate a first progressive signal having a first rate in response to an interlaced signal. The rate converter circuit may be configured to generate a second progressive signal having a second rate in response to the first progressive signal. The zoom circuit may be configured to generate an output video signal in response to the second progressive signal. The output video signal may represent a portion of the second progressive signal having a frame size equal to a frame size of the interlaced signal.

Another aspect of the present invention concerns a method for implementing a zoom in a digital video signal comprising the steps of (A) converting an interlaced video signal to a first progressive video signal having a first rate, (B) generating a second video signal having a second rate in response to the first video signal and (C) generating an output video signal in response to the second video signal. The output video signal may represent a portion of the second video signal having a frame size equal to a frame size of the interlaced signal.

The objects, features and advantages of the present invention include implementing method and/or circuit for providing a zoom in a video system that may (i) provide better picture quality than a conventional zoom, (ii) provide a zoom feature on either playback or on an echo during record, (iii) provide better picture quality for both film and video content, (iv) provide better picture quality for zoom during video format conversion, and/or (v) provide simplicity for incorporation into future processor generations by scaling the design.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be implemented to reduce the complexity of implementing a zoom feature. A hardware implementation may be used that supports future generation processors (e.g., the Domino processor, available from LSI Logic of Milpitas, Calif.). The present invention may enhance the picture quality of a zoom by providing a video image free from digital artifacts. The present invention may be used for either (i) playback or (ii) as an echo during record.

A zoom is a popular feature in DVD players/recorders and television set-top boxes (STB). The present invention may implement a zoom based on True Scan Pro technology, available from LSI Logic of Milpitas, Calif. This method simplifies the implementation of such a feature and greatly reduces the chance of common artifacts like combing noise.

Figure 1:
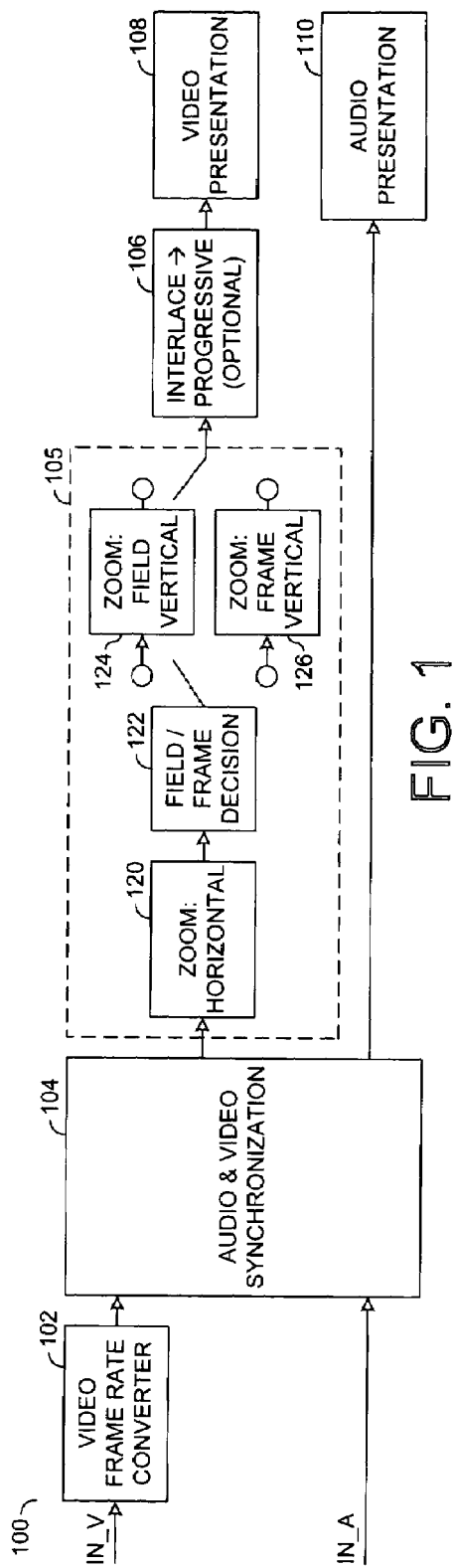
FIG. 1 is a diagram of a zoom implementation.

Referring to FIG. 1, a circuit 100 is shown implementing an audio/video presentation system. The circuit 100 generally comprises a video frame rate converter block (or circuit) 102, an audio and video synchronization block (or circuit) 104, a zoom block (or circuit) 105, an interlaced to progressive block (or circuit) 106, a video presentation block (or circuit) 108 and an audio presentation block (or circuit) 110. The zoom block generally comprises a horizontal zoom block (or circuit) 120, a field frame decision block (or circuit) 122, a vertical field zoom block (or circuit) 124 and a vertical frame zoom block (or circuit) 126. The field/frame decision block 122 selects either the vertical field zoom block 124 or the vertical frame zoom block 126.

Figure 2:
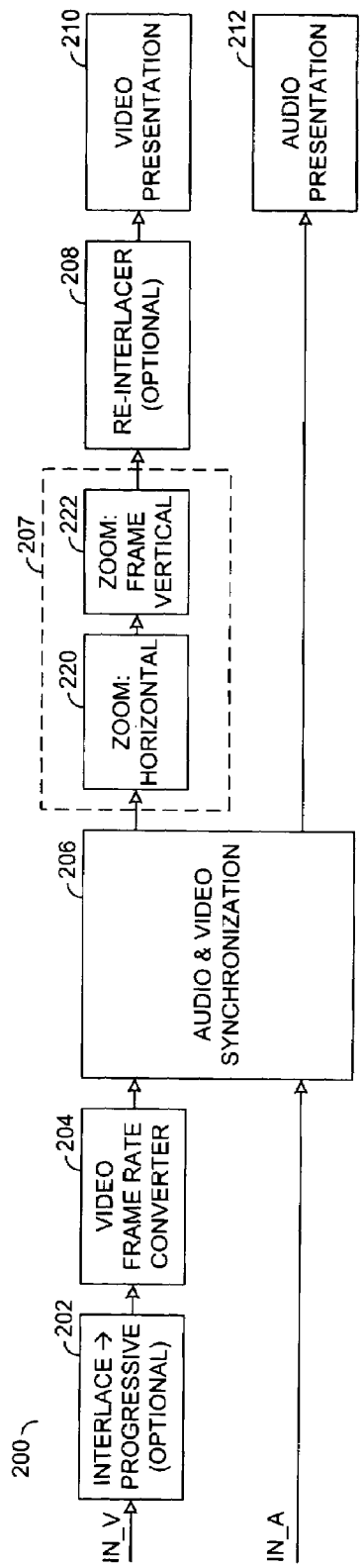
FIG. 2 is another diagram of a zoom implementation.

Referring to FIG. 2, a circuit 200 is shown illustrating a zoom system. The circuit 200 generally comprises an interlaced to progressive conversion block (or circuit) 202, a video frame rate converter block (or circuit) 204, an audio and video synchronization block (or circuit) 206, a zoom block (or circuit) 207, a re-interlacer block (or circuit) 208, a video presentation block (or circuit) 210, and an audio presentation block (or circuit) 212. The zoom circuit 207 generally comprises a horizontal zoom block (or circuit) 220 and a vertical zoom block (or circuit) 222. The re-interlacer circuit 208 may be used if an interlaced signal is desirable for a particular display device. However, the re-interlacer circuit 208 may not be needed in all design implementations. The video presentation circuit 210 may be a video monitor or other display device. The audio presentation circuit 212 may be implemented as a speaker or other device.

The interlaced to progressive circuit 202 may be implemented as a True Scan Pro technology, available from LSI Logic, Milpitas, Calif. However, other circuits that convert an interlaced signal to a progressive signal may be implemented to meet the design criteria of a particular implementation. The video frame rate converter circuit 204 may be implemented to operate in the progressive domain. The video frame rate converter circuit 204 may repeat or drop a frame based on the timestamp of the incoming frames and the selected video output frame rate. The video frame rate converter circuit 204 may also vertically resizing each frame to the desired output format (e.g., 480 input lines from NTSC source material may be resized to 576 output lines for PAL format display or vice-versa).

The audio and video synchronization circuit 206 may be used to synchronize video and audio samples to a common clock to ensure "lip-sync" during the presentation. The zoom circuit 208 may be implemented to extract a portion of the input frame to expand to a full-screen output size. The zoom circuit 208 processes an input signal that is in a progressive format (e.g., 60 frames per second).

The re-interlacer circuit 210 may be an optional circuit that may convert back to an interlaced format (e.g., NTSC or PAL). The re-interlacer circuit 210 may extract half the lines of each input frame, typically used in all TV scanning equipment. While modern video displays normally accept a progressive signal, older displays may still need an interlaced signal. Furthermore, video scalers often use an interlaced signal rather than a progressive signal.

Figure 3:
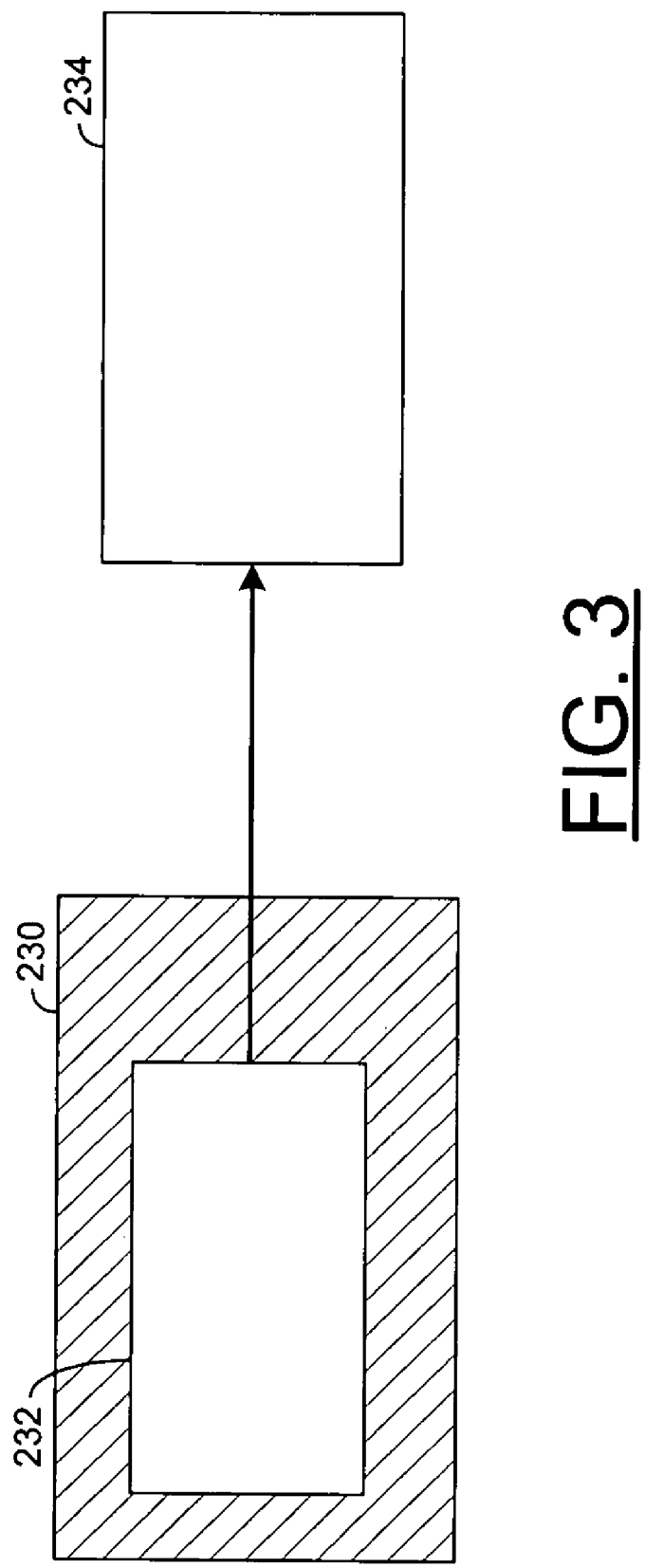
FIG. 3 is a diagram illustrating a zoom transformation.

Referring to FIG. 3, an example of a zoom transformation is shown. An input picture 230 is shown having a region 232. The region 232 needs to be expanded to fit the output picture 234. The output picture 234 is created by vertically and horizontally filtering the region 232. Extra care needs to be taken when performing vertical filtering, since the picture 230 is made of 2 independent fields. In particular, a video frame is made of two distinct video fields that are presented at different times (e.g., $\frac{1}{50}^{th}$ of a second apart in video formats like PAL, $\frac{1}{60}^{th}$ of a second apart in video formats like NTSC).

Several different processes may have created the content of the video frame. A first process (or case) may be a video camera (e.g., sampling interlaced fields at the field rate, creating video fields the same way as taking a picture every $\frac{1}{50}^{th}$ or $\frac{1}{60}^{th}$ of a second depending on the video format). A second process (or case) may be the telecine machine converting 24 frame-per-second movies into video, or 12 frame-per-second cartoons in video for example.

In the first case, the two video fields have been sampled at different times and need to be presented with the correct delay between then. In the second case, some video fields may just be sampled at the same time, presenting a still image. One field may be the top lines. The other field may be the bottom lines (interlaced) of the same image. Not all of the fields may be sampled.

In the first case, vertical filtering may be implemented on a field by field base (called field filtering). Field filtering normally avoids having one field "bleed" into the other and vice versa. Field filtering avoids the so-called "combing" noise in the resulting picture. In the second case, vertical filtering may be implemented on the whole frame (called frame filtering), rather than field-by-field, creating a picture with better definition (or less blurriness). The vertical zoom circuit 222 is generally implemented as frame filtering. There are no such field/frame distinctions in the horizontal filtering.

The present invention is generally based on progressive input frames and generally relies on using frame-based only vertical filtering. Simple frame-based vertical filtering avoids complex process decisions and can easily be implemented in hardware (VLSI) for a cost effective solution. Since the present invention is based on progressive input frames, visual artifacts like "combing noise" found in poor vertical filtering of interlaced video are normally avoided.

Figure 4:
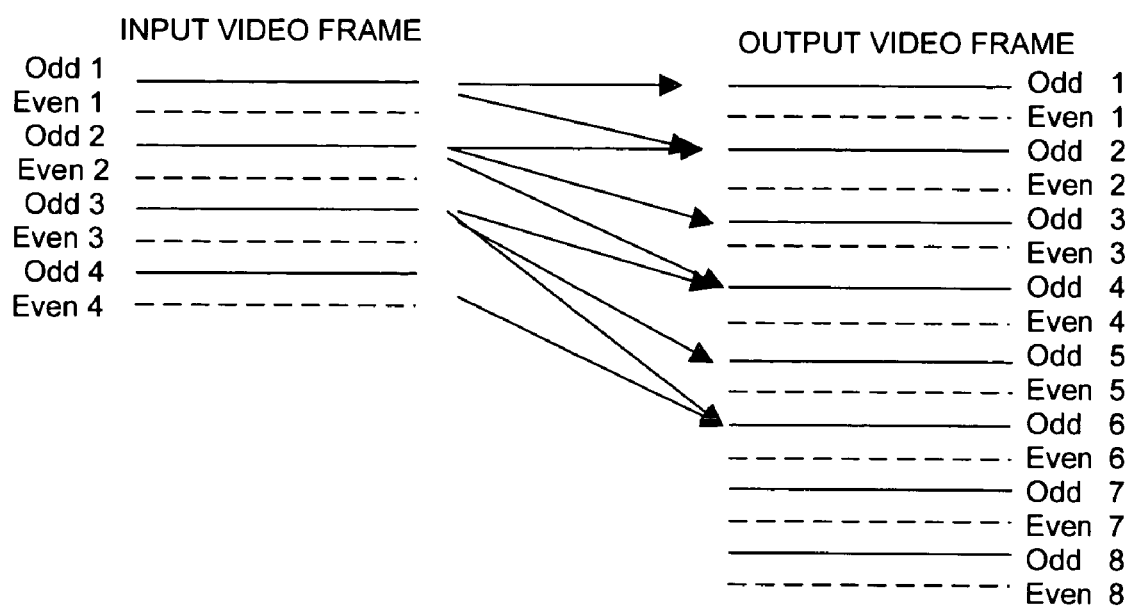
FIG. 4 is a diagram illustrating an example of an implementation of field filtering for a 2× vertical zoom is shown.

Referring to FIG. 4, a diagram illustrating an implementation of field filtering for a 2× vertical zoom is shown. The main idea of field filtering is that only odd lines of the input video frame contribute to create the odd lines of the output video frame. In the example of FIG. 4.

The output frame Odd1 is made from the input frame Odd1. The output frame Odd2 is made of combination of the input frame Odd1 and the input frame Odd2. The output frame Odd3 is made of the input frame Odd2. The output frame Odd4 is made of combination of the input frame Odd2 and the input frame Odd3. The sequence repeats for the remaining frames.

Similarly, even output lines are created only from input even lines. Since odd and even fields are presented at different times, each field corresponding to a different time stamp (sampling). Since odd frames and even frames are matched, each output field is created from the respective time stamps. The time stamps are maintained on a per field basis. Since the input frame is a "progressive" picture (meaning that both fields are from the same original picture) the field processing creates output lines from input lines being 2 input frame lines apart (skipping over the opposite field), losing definition in the resealing process.

Figure 5:
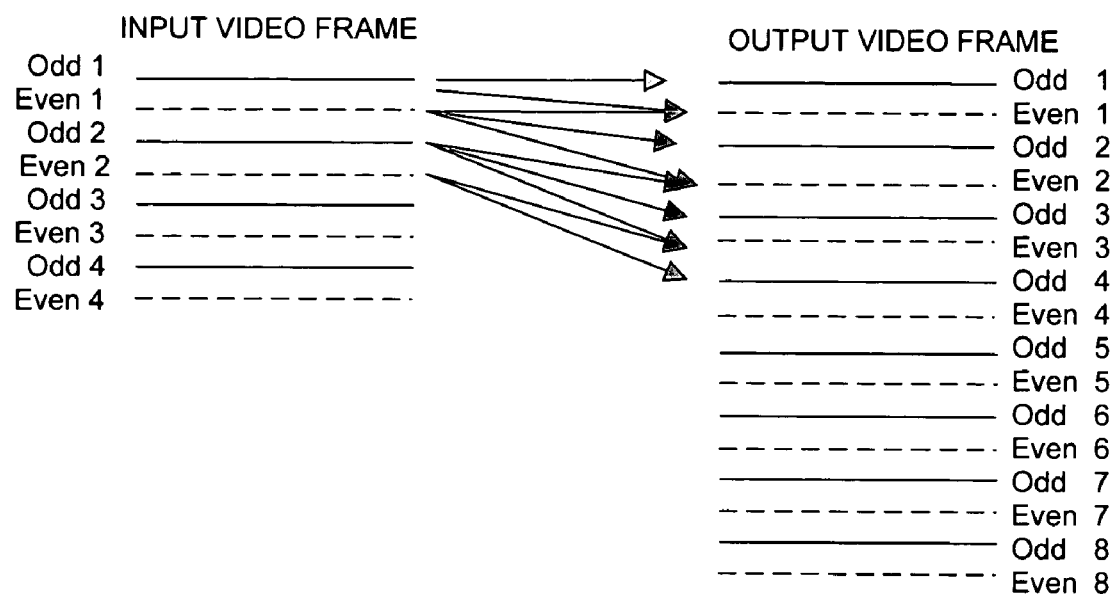
FIG. 5 is a diagram illustrating an implementation of frame filtering for a 2× vertical zoom is shown.

Referring to FIG. 5, an example illustrating an implementation of frame filtering for a 2× vertical zoom is shown. The input lines of the input video frame contribute to create each of the lines of the output video frame. In the example shown in FIG. 5:

The output frame Odd1 is made from the input frame Odd1. The output frame even1 is made of the combination of the input frame Odd1 and the frame even1. The output frame Odd2 is made from the input frame even1. The output frame even2 is made from the combination of the input frame even1 and the input frame Odd2. The output frame Odd3 is made of the input frame Odd2. The output frame even3 is made of the combination of the input frame Odd2 and the input frame even2. The path repeats for the rest of the frames.

Similarly, all output lines are created from all input lines, regardless of the interlacing aspect since the original picture is "progressive" (i.e., still picture which both fields belong to the same time stamp). Since line samples creating the output lines are close to each other, better definition may be achieved. When dealing with video material (fields belonging to different time stamps) since combining odd and even fields to create output lines creates the so-called "combing-noise" effect when such fields correspond to different time samples. The vertical zoom circuit 222 normally implements the filtering shown in FIG. 5.

Figure 6:
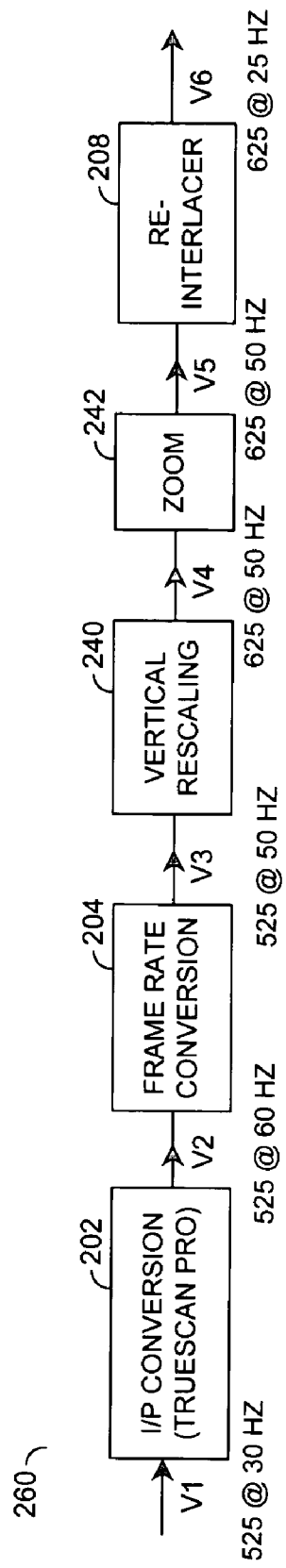
FIG. 6 is a block diagram illustrating an example of progressive dropping before re-interlacing.

Referring to FIG. 6, an example of a system 260 illustrating a zoom on a progressive signal is shown. The system comprises the conversion circuit 202, the frame rate conversion circuit 204, a vertical resealing circuit 240, a zoom circuit 242 and the re-interlace circuit 208. By using the de-interlacing circuit 202, a progressive video signal (e.g., V2) is created in response to an interlaced video signal (e.g., V1). By converting to the progressive signal V2 before further processing and/or conversion, the concept of top/bottom fields is not relevant for additional processing. Rather, the progressive frames of the signal V2 are each positioned at a field-time interval (e.g., every $\frac{1}{60}^{th}$ of a second). A frame rate conversion circuit 204 drops one progressive frame every six input frames, creating a progressive output signal (e.g., V3) at the desired rate (e.g., 50 Hz), with smooth motion. Each output frame of the signal V3 is progressive (e.g., having 525 lines operating at 50 Hz). The vertical rescaler 240 generates a signal (e.g., V4) having, for example, 625 lines operating at 50 Hz. The zoom circuit 242 generates a signal (e.g., V5) having, for example, 525 lines operating at 50 Hz.

The vertical rescaler circuit 240 only needs to perform progressive or frame-based filtering to adjust the size and does not need to perform complex field/frame decisions. The re-interlacer circuit 208 generates a signal (e.g., V6) having, for example, 625 lines operating at 25 Hz. The re-interlacer circuit 208 extracts the top or bottom lines of each incoming frame to create an interlaced result in a format presentable by an interlaced video display. The particular resolutions (e.g., 525 lines, 625 lines, etc.) and the particular operating frequencies (e.g., 25 Hz, 30 Hz, 50 Hz, 60 Hz, etc.) may be modified to meet the design criteria of a particular implementation.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a de-interlacer circuit configured to generate a first progressive signal having a first rate in response to an interlaced signal;
   a converter circuit configured to generate a second progressive signal having a second rate in response to said first progressive signal by filtering one progressive frame out of each of a fixed number of frames of said first progressive signal; and
   a zoom circuit configured to generate an output video signal in response to said second progressive signal, wherein said output video signal represents a portion of said second progressive signal having a frame size equal to a frame size of said interlaced signal.

2. The apparatus according to claim 1, wherein said zoom circuit comprises (i) a horizontal zoom and (ii) a vertical zoom, wherein said horizontal and vertical zoom are implemented in series on said second progressive signal.

3. The apparatus according to claim 2, wherein said vertical zoom comprises a frame filtering vertical zoom.

4. The apparatus according to claim 1, further comprising:
   an interlacing circuit configured to generate said output video signal having an interlaced pattern.

5. The apparatus according to claim 1, wherein said first rate comprises 60 Hz and said second rate comprises 50 Hz.

6. The apparatus according to claim 1, wherein said first progressive signal has a first image size and said second progressive signal has a second image size, wherein said first and second image sizes are different sizes.

7. The apparatus according to claim 6, wherein (i) said first image size comprises a first horizontal size and a first vertical size and (ii) said second image size comprises a second vertical size and a second horizontal size.

8. The apparatus according to claim 1, wherein said zoom circuit operates during recording of said interlaced signal.

9. The apparatus according to claim 1, wherein said zoom circuit operates during playback of said output video signal.

10. The apparatus according to claim 1, wherein said interlaced signal presents a first interlaced field and a second interlaced field every $\frac{1}{30}$ of a second.

11. The apparatus according to claim 1, wherein said first progressive signal comprises frames presented every $\frac{1}{60}$ of a second.

12. A method for implementing a zoom in a digital video signal comprising the steps of:
   (A) converting an interlaced video signal to a first progressive video signal having a first rate;
   (B) generating a second progressive signal having a second rate in response to said first video signal by filtering one progressive frame out of each of a fixed number of frames of said first progressive signal; and
   (C) generating an output video signal in response to said second video signal, wherein said output video signal represents a portion of said second video signal having a frame size equal to a frame size of said interlaced signal.

13. The method according to claim 12, wherein step (C) comprises (i) a horizontal zoom and (ii) a vertical zoom, wherein said horizontal and vertical zoom are implemented in series on said second progressive signal.

14. The method according to claim 12, wherein said first rate comprises 60 Hz and said second rate comprises 50 Hz.

15. The method according to claim 12, wherein said first progressive signal has a first image size and said second progressive signal has a second image size, wherein said first and second image sizes are different sizes.

16. The method according to claim 15, wherein (i) said first image size comprises a first horizontal size and a first vertical size and (ii) said second image size comprises a second vertical size and a second horizontal size.

17. The apparatus according to claim 1, wherein said converter circuit is configured to filter said first progressive signal by dropping one progressive frame out of each of said fixed number of frames of said first progressive signal.

18. The apparatus according to claim 1, wherein said converter circuit is configured to filter said first progressive signal by dropping one progressive frame out of every six input frames.

19. The apparatus according to claim 1, wherein said converter circuit comprises a rate converter circuit.

* * * * *